United States Patent [19]

Bunner et al.

[11] Patent Number: 5,359,576
[45] Date of Patent: Oct. 25, 1994

[54] VOICE ACTIVATED TARGET LAUNCHING SYSTEM WITH AUTOMATIC SEQUENCING CONTROL

[75] Inventors: Gary N. Bunner, Starkville; Michael A. Goines, Pheba, both of Miss.

[73] Assignee: The Computer Learning Works, Inc., Starkville, Miss.

[21] Appl. No.: 822,128

[22] Filed: Jan. 17, 1992

[51] Int. Cl.$^5$ ............................................. H04Q 1/00
[52] U.S. Cl. ................................... 367/197; 381/105; 434/16; 124/34
[58] Field of Search ................... 367/197, 198; 124/32, 124/34; 381/42, 105, 110; 434/16; 340/825.69

[56] References Cited

U.S. PATENT DOCUMENTS

| | | | |
|---|---|---|---|
| 3,502,333 | 3/1970 | Fleury | 273/101.1 |
| 3,568,199 | 3/1971 | Hartness | 343/225 |
| 3,680,863 | 8/1972 | Wallace | 124/32 |
| 3,770,981 | 11/1973 | Nelsen | 307/154 |
| 4,302,749 | 11/1981 | Ylonen | 367/198 |
| 4,471,683 | 9/1984 | Brown | 89/1 A |
| 4,699,116 | 10/1987 | Freeland et al. | 124/7 |
| 5,194,006 | 3/1993 | Zaenglein | 434/16 |

Primary Examiner—Donald J. Yusko
Assistant Examiner—Brian Zimmerman
Attorney, Agent, or Firm—Jacobson, Price, Holman & Stern

[57] ABSTRACT

A voice activated skeet/trap triggering system comprising a receiver unit and at least one transmitter unit. The receiver unit interfaces with the target launcher via an interface cable, which cable replaces the conventional puller cable that supports the mechanical switches. The transmitter unit includes a voice microphone mounted and a transmitter microprocessor unit (MPU). The transmitter MPU cooperates with amplifying circuitry, sensitivity circuitry, and an A/D converter to generate a digital word when a proper voice command is picked up by the microphone and recognized. The digital word is frequency modulated onto an FM carrier signal. The receiver unit receives the FM signal and demodulates it to retrieve the digital word. The bits of the digital word are examined to determine the proper target to launch. The receiver includes a receiver microprocessor unit (MPU) which examines the target bits to determine if the next target in the sequence should be launched or if a designated target should be launched. If the next target in the sequence should be launched, then the microprocessor accesses a stored target sequence table to determine the next target in the sequence, and generates output relay bits to control high and low relays, which relay or relays generate output signals to the solenoids of the high house and low house target launchers in the case of skeet, or just the high house target launcher in the case of trap.

24 Claims, 7 Drawing Sheets

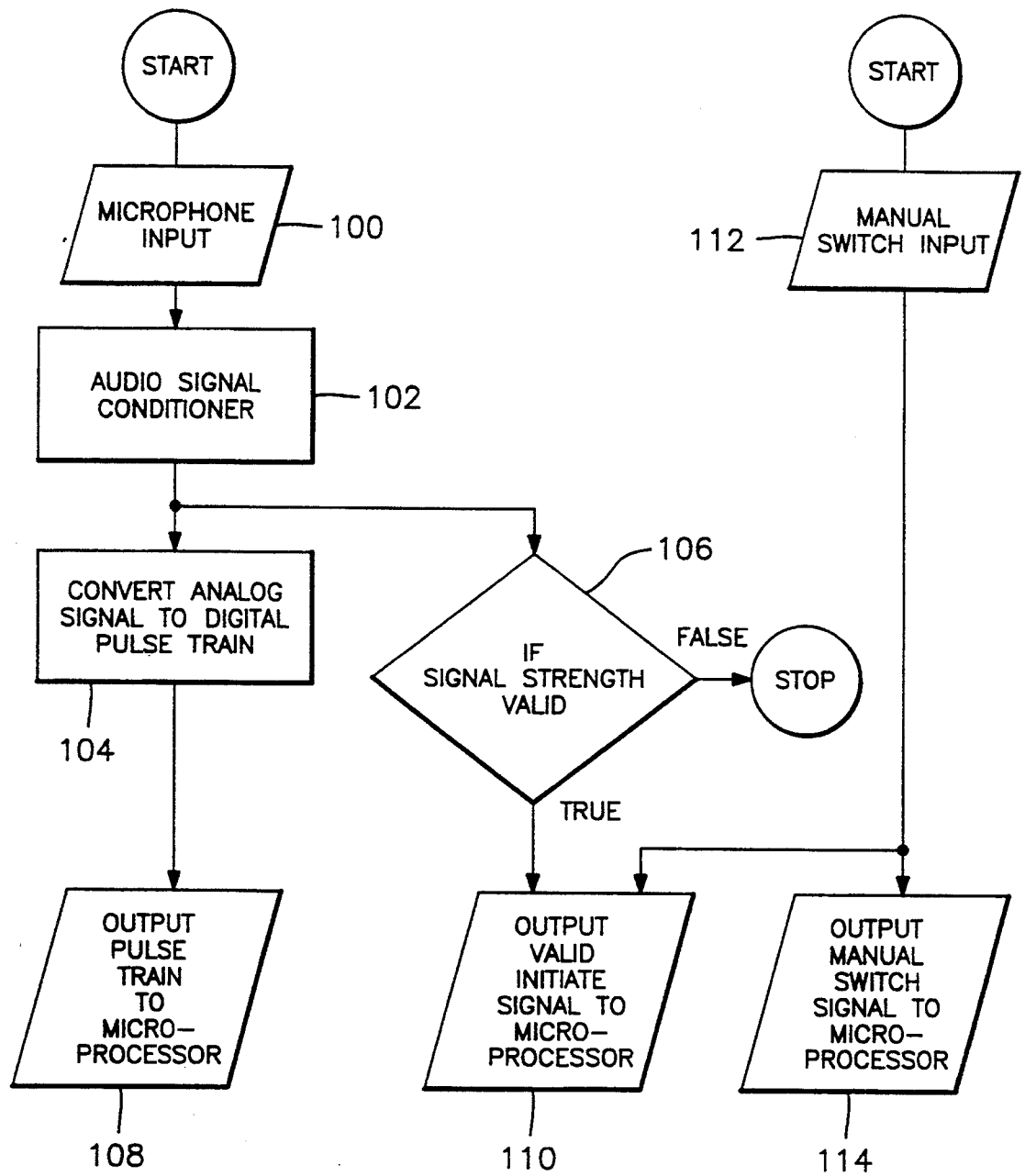

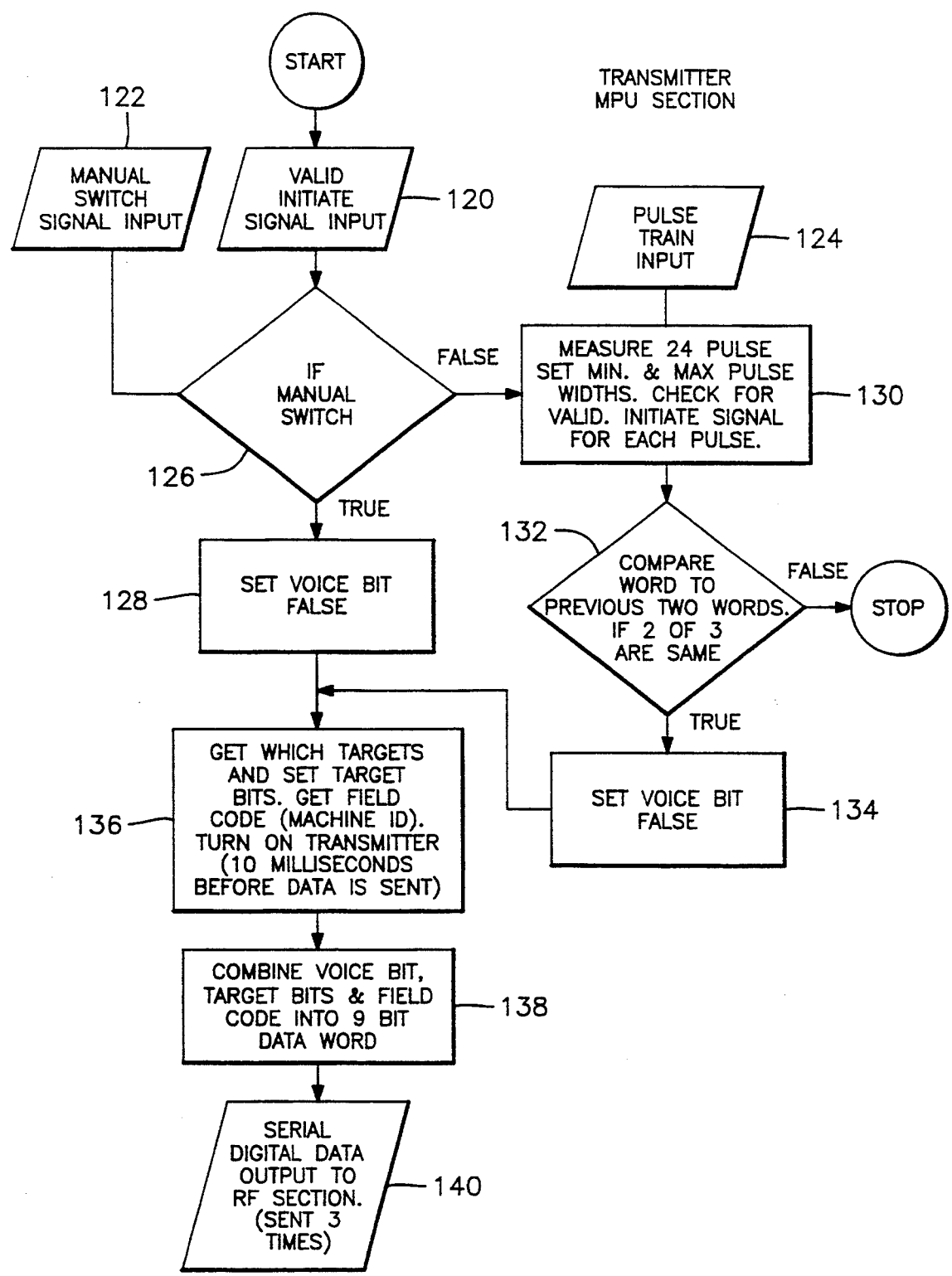

VOICE ACTIVATED TARGET LAUNCHING SYSTEM WITH AUTOMATIC SEQUENCING CONTROL

BACKGROUND OF THE INVENTION

The present invention relates to a system for remotely triggering release of a target, such as from a skeet or trap target launcher, by voice command of a shooter.

In the sport of skeet or trap shooting, clay targets are remotely launched from launching machines. To trigger a launch, a shooter calls the word "pull" to a person who holds the target launch control switches. That person is called a "puller". In response to hearing the word "pull", the "puller" hits the appropriate button for launching the clay targets which the shooter attempts to shoot down in the air, from various shooting stations.

The "puller" controls the launch of targets with a switching mechanism terminating a hardwired cable connected to the target launching mechanisms. The switching mechanism for a skeet range usually has three push button switches: one for the high house target; one for the low house target; and one for doubles (a high house target and a low house target launched at the substantially the same time).

In skeet and trap, there must be a "puller" to launch the targets for the shooters. To overcome the need for a "puller", remote control systems have been developed which respond to the shooter's voice command. See U.S. Pat. No. 3,770,981 to Nelsen. This patent discloses a voice controlled target release system in which a microphone is provided for each shooter, which microphone is connected to electronic circuitry for detecting a shooter's voice command and which is hardwired connected to the target launching machine.

In addition, improvements have been made in which the hardwire connection between the puller and the target launching machine is eliminated. Specifically, U.S. Pat. No. 3,568,199 to Hartness discloses a radio controlled trap shooting apparatus including a multi-channel radio transmitter mounted on a scoring board and a fixed multichannel radio receiver, which receives selected signals from the transmitter. The transmitter is not voice activated, but is, rather, push button activated by a puller who is not the shooter. Distinct buttons are provided for the high house, low house and double targets. A unique transmission channel is provided for each of these targets.

Other improvements have been made to trap shooting ranges in which voice calls may be detected from each of the shooting stations at which a microphone is provided. See U.S. Pat. No. 4,302,749 to Ylonen.

There are deficiencies in these systems. It is not unusual for launching machines to break a target upon launching. The prior art systems do not provide for permitting a shooter to relaunch a target at a particular station, by voice command, and then return to the next target in the sequence. The puller keeps track of the sequence in these prior systems and, thus, these systems are not designed for use by a single person. Such is the case for the device of the Hartness patent. The puller simply presses the appropriate button to release the target(s) again.

It is desirable that a shooter be able to do his/her own pulling often because the shooter has nobody to accompany him/her to the range to do the pulling. This is the case in order to shoot a round of skeet or to practice movements at each shooting station for each target. Therefore, a remote release mechanism is needed which is unobtrusive and requires virtually no disruption of a shooter's rhythm.

However, when the shooter does his/her own pulling, and preferably by radio control, the situation becomes more complicated. It is necessary for some part of the system to remember the position in the sequence when a relaunch of a target is desired, for repeated practice or whatever reason. The normal hooting sequence must be returned to without loosing track of the targets to be launched.

SUMMARY OF THE INVENTION

It is a primary object of the present invention to provide a voice activated skeet/trap triggering system which operates via a radio link and automatically maintains the target launching sequence.

It is yet another object of the present invention to provide voice activation of skeet/trap launchers by a shooter using microprocessor technology to analyze audio signals and discriminate voice signals of the shooter from spurious signals.

It is a further object of the present invention to provide a voice activated skeet/trap triggering system which operates via a radio link and includes a method of encoding and transmitting target selection data on a single channel using digital words.

It is yet another object of the present invention to provide a voice activated skeet/trap triggering system which may accommodate multiple shooters, each provided with radio transmitters which communicate with a single receiver unit.

It is yet another object of the present invention to provide a voice activates skeet/trap triggering system which operates via a radio link and which includes a receiver unit that interfaces with the target launching machine, the receiver unit having a microprocessor that maintains the sequence of targets to be launched, in the event the sequence is interrupted.

Briefly, the present invention relates to a voice activated skeet/trap triggering system comprising a receiver unit and at least one transmitter unit. The receiver unit interfaces with the target launcher via an interface cable, which cable replaces the conventional puller cable that supports the mechanical switches. The transmitter unit comprises a voice microphone which may be mounted around the neck of a shooter to fit intimately against the throat of the shooter. Other types of voice microphones may be used which the user wears. A cable connects the microphone to a transmitter body which houses the circuitry and a transmitter microprocessor unit (MPU). The transmitter MPU cooperates with amplifying circuitry, sensitivity circuitry, and an A/D converter to generate a digital word when a proper voice command word is picked up by the microphone and recognized. The digital word is a nine bit word including a voice bit indicating that voice triggering is used, a manual trigger bit indicating manual triggering is used, field code bits indicating that the digital word is valid and sent by a valid transmitter unit, and target bits identifying a particular target to be launched, if one is chosen. The digital word is frequency shift modulated onto an FM carrier signal.

The transmitter MPU may respond to voice triggering and manual push button triggering. In addition, the transmitter unit includes buttons for selecting a particular target to be launched, irrespective of the next target in to be launched in the sequence. This allows for re-launching of targets in the event that a broken clay target is launched, if the shooter wants to repeat an attempt at a target, or if the shooter needs a particular target launched for an option shot.

The receiver unit receives the FM signal and demodulates it to retrieve the digital word. The bits of the digital word are examined to determine the proper target to launch. In particular, the receiver includes a receiver microprocessor unit (MPU) which examines the target bits to determine if the next target in the sequence should be launched or if a designated target should be launched. If the next target in the sequence should be launched, then the microprocessor accesses a stored target sequence table to determine the next target in the sequence, and generates output relay bits to control high and low relays, which relays generate output signals to the solenoids of the high house and low house target launchers. Otherwise, if a particular target out of sequence is to be launched, the microprocessor generates the appropriate output relay bits to actuate the proper relays.

The receiver unit has controls for setting the delay of a target launch, and for the particular skeet sequence, American or International. In addition, the receiver has a switch for selecting the number of transmitters to respond to in a round of skeet. Moreover, each shooter may deviate from the normal target sequence. The receiver MPU maintains the sequence for each shooter by the target sequence table.

The above and other objects and advantages of the present invention will become more readily apparent when reference is made to the following description taken in conjunction with the accompanying drawings.

BRIEF DESCRIPTION OF THE DRAWINGS

FIGS. 3-5 are flow chart diagrams illustrating the operation of the transmitter unit.

DETAILED DESCRIPTION OF THE DRAWINGS

Figure 1:
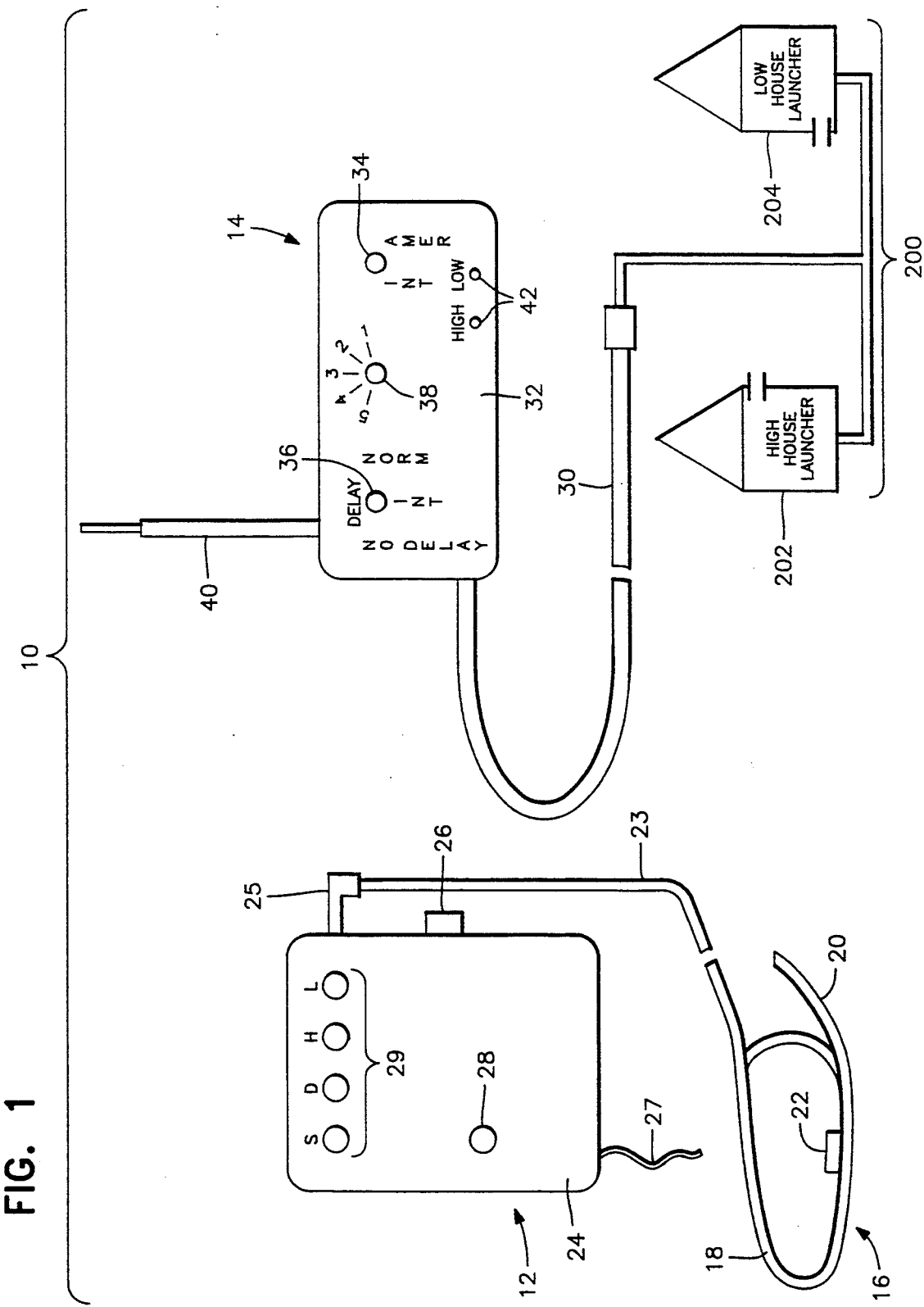
FIG. 1 is a perspective view illustrating the transmitter and receiver units of the voice activated triggering system according to the present invention.

Referring first to FIG. 1, the voice activated skeet/-trap triggering system is generally shown at 10 and comprises a transmitter unit 12 and a receiver unit 14. The receiver unit 14 is placed proximate the mechanical target launching machine of the trap/skeet range and may cooperate with one or several transmitter units 12, although only one is shown in the figure. When used hereinafter, the term "target launching machine" may mean the two launchers used at skeet ranges (high house and low house), or a single launcher, such as those used at trap ranges.

As will become apparent from the following description, the system 10 automatically controls the sequence of launching targets, according to American or International skeet rules. Tables 1 and 2 below describe the sequence of the targets for American and International skeet, respectively.

Should a broken target be thrown or the shooter desire to shoot the same target again, the user may trigger the throw of a target at the same shooting position for as many times as necessary or desired, and the system will "remember" the shooter's shooting position in the skeet sequence. Once the shooter decides to move to the next shooting position or shoot at the next target in the sequence at the same shooting position, the appropriate next target in the sequence will be thrown.

TABLE 1

| AMERICAN SKEET-TARGET SEQUENCE | |
| --- | --- |
| STATION | TARGETS |
| 1 | High, Low, Doubles |
| 2 | High, Low, Doubles |
| 3 | High, Low |
| 4 | High, Low |
| 5 | High, Low |
| 6 | High, Low, Doubles |
| 7 | High, Low, Doubles |
| 8 | High, Low, Low (option) |

TABLE 2

| INTERNATIONAL SKEET-TARGET SEQUENCE | |
| --- | --- |
| STATION | TARGETS |
| 1 | High, Doubles |
| 2 | High, Low, Doubles |
| 3 | High, Low, Doubles |
| 4 | High, Low |
| 5 | High, Low, Doubles |
| 6 | High, Low, Doubles |
| 7 | Doubles |
| 8 | High, Low |

The transmitter unit 12 is designed to be worn or attached to the body of a user and includes a throat mounted microphone assembly 16. The microphone assembly 16 may consist of a neck strap 18 with an adjustment piece 20 and a microphone 22, which is well-known in the art. When mounted around the neck of the user, the microphone 22 gently abuts the throat of the user, and picks up voice sounds emitted by the user. Other voice microphones may be used, such as lapel-mounted microphones.

A transmitter body 24 supports user controls and receives the output of the microphone 22 via a cable 23 and a terminal plug 25. A microphone sensitivity control knob 26 is provided on the body 24, and is used to control the sensitivity of the microphone 22 so as to avoid erroneous triggering. As will be explained in more detail hereinafter, the microphone sensitivity is set to optimize response to a voice command. The preferred command is the word "pull", commonly used to trigger launch of a target.

The transmitter unit 12 also includes manual mechanical switch trigger control of a target. A mechanical push button switch 28 is provided on the transmitter body 24 and is used to trigger throw of a target. In addition, target select switches 29 are provided on the transmitter body 24, and are labelled "S" for the next target in the sequence; "D" for double launch; "H" for a high house target; and "L" for a low house target. As will be explained in greater detail hereinafter, if one of the "H", "L" or "D" target select switches 29 are depressed, then the current shooting position is held, and targets are thrown in the prescribed manner at the shooting position until a transmission is made with the sequence button "S" depressed, in which case the next target thrown will be for the next in the skeet sequence.

The transmitter unit 12 emits a radiofrequency signal, via an antenna 27 which is received by the receiver unit 14. The receiver unit 14 processes the radiofrequency signal and supplies a control signal to the trigger controls of the mechanical throwing mechanism. The antenna 27 is made of flexible and unobtrusive rubber coated wire.

In this regard, the receiver unit 14 interfaces directly with the mechanical throwing mechanism (not shown) via an interface cable 30. The interface cable 30 therefore replaces the typical control cable which supports the mechanical trigger switches of the target launcher.

The receiver unit 14 includes a body 32 which supports various control switches. In order to accommodate the different target throwing sequences of American skeet and International skeet, the receiver unit 14 includes processing capabilities for each and a switch 34 to set which target sequence will be followed. In addition, the receiver has a delay control switch 36 to set the amount of delay before releasing targets. The delay options are no delay, International (0.1-3.0 seconds) delay, and normal delay. The normal delay is for simulating the reaction time of the "puller". The delay is imposed only when a voice call is detected and not for manual triggering. Finally, the receiver unit 14 includes a participant switch 38 for selecting the number of shooters to be used with the receiver unit for a round of skeet.

The delay control switch 36 and the target sequence switch 34 allow a shooter to shoot International skeet. The rules of International skeet require that the shooter hold his/her gun in a lowered position until the target is released. The release of the target may be delayed randomly from 0.1 to 3.0 seconds from the time of the call. This delay is an integral part of International skeet.

The receiver unit 14 has an antenna 40 which detects the radio frequency signal sent by the transmitter unit(s) and processes the received signal to determine which target is to be thrown. A relay output signal(s) is generated to activate the solenoid(s) of the mechanical target launching machine. The receiver unit 14 also maintains the sequence of targets to be launched at each of the various shooting positions, for American and International skeet. In addition, light emitting diodes 42 are provided on the receiver unit 14 to indicate which relay(s) (high house, low house or both) is triggered. The receiver unit 14 connects to a clay pigeon target launching machine 2000 having, in the case of skeet, for example, a high house target launcher 202 and a low house target launcher 204.

Figure 2A:
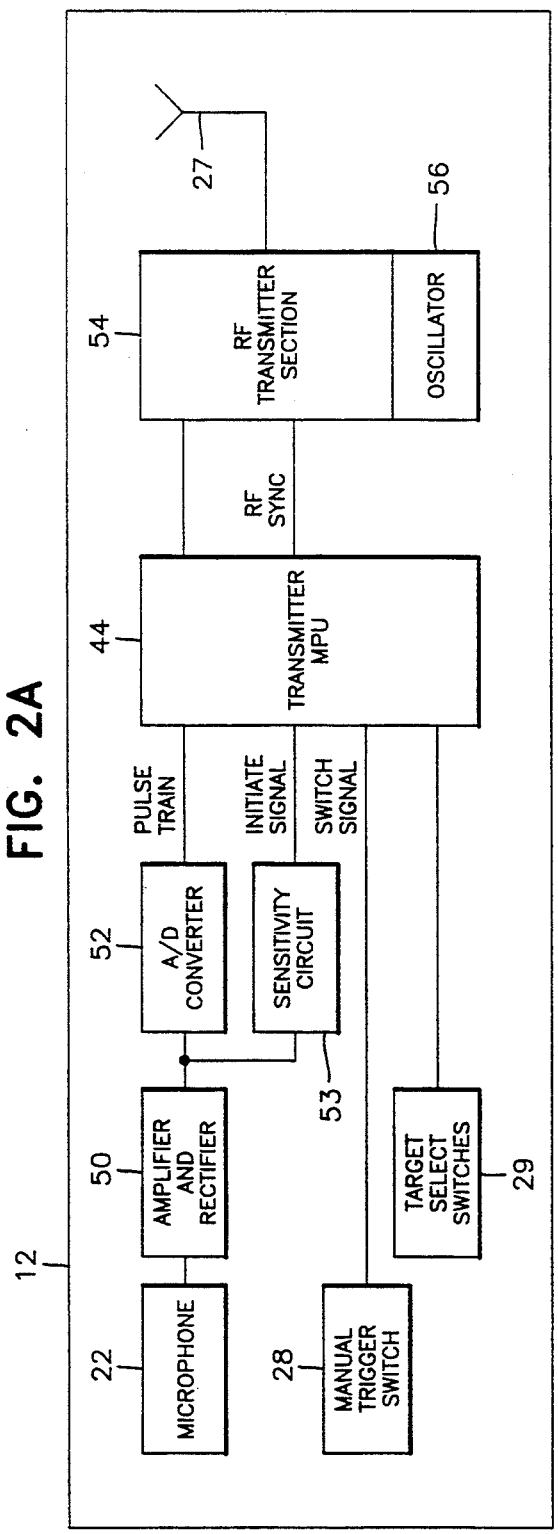
FIGS. 2A and 2B are block diagrams illustrating the components of the transmitter and receiver units, respectively.
Figure 2B:
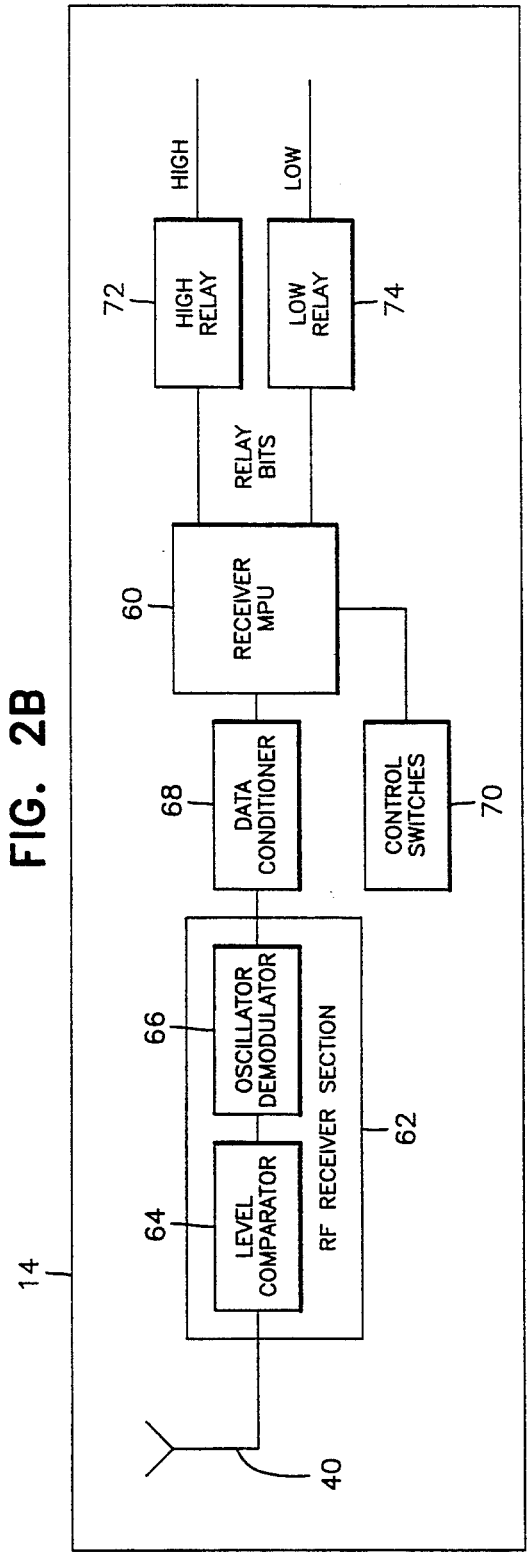

Turning now to FIGS. 2A and 2B, the internal components of the transmitter unit 12 and receiver unit 14 will now be described. Serving as the heart of the transmitter unit 12 is a transmitter microprocessor unit (MPU) 44. All signals to be transmitted are processed by the transmitter MPU.

Specifically, the output of the microphone 22 is amplified and rectified by an amplifier and rectifier circuit 50 which includes circuitry for generating a DC voltage of the audio signal and also an integrator for integrating peaks of the audio signal to generate spikes, the width of the spikes being proportional to the frequency of the audio signal. Circuitry for performing the function of the amplifier and rectifier circuit is well known in the art. The output of the circuit 50 is then digitized by an A/D converter 52. The A/D converter 52 generates a digital pulse train representative of the output of the circuit 50 and supplies the pulse train to the transmitter MPU 44. In addition, the DC output of the amplifier and rectifier circuit 50 is compared with a threshold in a sensitivity circuit set by the sensitivity control knob 26. If the level of the amplified and rectified audio signal exceeds the threshold, an INITIATE signal is supplied to the transmitter MPU 44. The manual trigger switch 28 and target select switches 29 are also connected to the transmitter MPU 44.

As will be explained in more detail hereinafter, based on the positions of the manual trigger switch 28 and the target select switches 29, the transmitter MPU 44 generates a digital word which is modulated on a radiofrequency carrier signal and transmitted via the radiofrequency (RF) transmitter section 54. In this regard, the MPU 44 supplies the RF transmitter section 54 with a digital word as data and a RF sync signal, to turn the RF section on. The oscillator 56 in the RF transmitter section 54 is then modulated by the digital word to produce the radiofrequency carrier signal, which is emitted via antenna 58.

Similarly, the receiver unit 14 includes a receiver MPU 60 which serves as the heart of the receiver unit. The radiofrequency signal emitted by the transmitter 40 is detected by the receiving antenna 40 and is processed by an RF receiver section 62. In the RF receiver section 62, the received signal is compared to a nominal reference level by a level comparator 64 and if above the reference level, it is demodulated by the demodulator 66. The demodulated signal, corresponding to the transmitted digital word is conditioned in a signal conditioner 68 to amplify and square up the signal to binary form which is then fed to the receiver MPU 60. Circuitry for performing the function of the signal conditioner is well known in the art.

The block 70 represents the switches 34, 36 and 38 on the receiver unit 14, the output of these switches being connected to the receiver MPU 60. Based on the position of the control switches 70 and the digital word demodulated by the demodulator 66, the receiver MPU 60 generates output control signals which control a high relay circuit 72 and a low relay circuit 74. In response, the high relay circuit and/or low relay circuits 72 generate output signals for energizing the solenoids in the target launching machine.

Though not shown in the FIG. 2B, each of the relay circuits 72 and 74 includes a transistor, the base of which is driven by the output of the receiver MPU 60 for the relay bits. The collector of the transistor is connected to the coil of a relay. The relay contacts close when the transistor is energized by a high at its base from the relay output of the MPU 60. The relay contacts effectively replace the switches of the conventional cord control line of the target launcher. Therefore, when the interface cable 30 is properly connected to the target launcher, the solenoid circuit of the launcher is completed by closing the contacts of the relay, thus energizing the solenoid via a 115 AC voltage normally supplied to the target launcher. This causes the target launcher to release a clay target.

Figure 5:
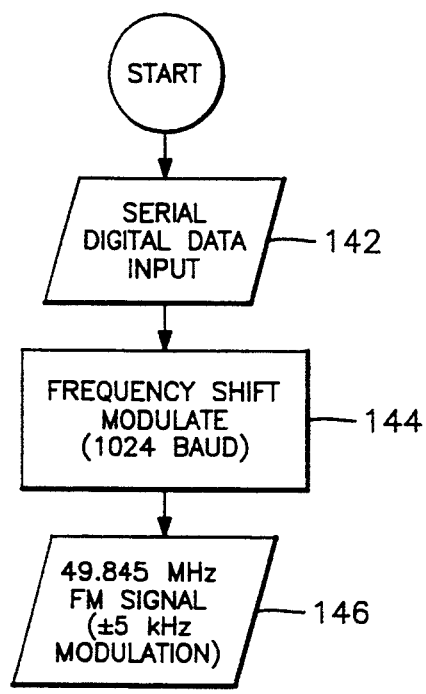

A description of the operation of the transmitter unit 14 will now be provided, with reference to FIGS. 3-5 in conjunction with FIG. 2A.

FIG. 3 illustrates the steps for processing an audio or manual trigger signal. The branch of steps 100-108 are taken if voice trigger is used. The branch of steps 112-114 is taken if manual trigger is used. Triggering via each of these methods involves a common INITIATE signal in conjunction with a signal unique to that particular triggering method, which pair of signals are fed to the transmitter MPU 44.

In voice triggering, the microphone input signal is picked up in step 100 and is conditioned in step 102 by the amplifier and rectifier circuit 50 to generate a series of spikes having widths proportional to the frequency of the audio signal. The A/D converter 52 then converts these spikes to a digital pulse train in step 104, which is supplied to the transmitter MPU 44 in step 108. The digital pulse train also is a series of pulses, in which the pulse widths are proportional to the audio frequency. At the same time, the sensitivity circuit measures the DC level of the amplifier and rectified audio signal and if it is greater than a sensitivity level set by the sensitivity control knob 26, an INITIATE signal is generated and supplied to the transmitter MPU 44 in step 110. If the conditioned audio signal does not exceed the sensitivity level, then an INITIATE signal is not sent to the transmitter MPU 44.

Similarly, upon actuation of the manual push button switch 28 in step 112, a SWITCH signal is generated and supplied to the transmitter MPU 44 in step 114 together with an INITIATE signal in step 110.

Thus, depending on the particular method of triggering, a pair of signals is supplied to the transmitter MPU 44. If voice triggering is used and an audio signal is detected which exceeds the set sensitivity level, then a digital pulse train and an INITIATE signal are supplied to the transmitter MPU 44. If manual push button triggering is used, then a SWITCH signal together with an INITIATE signal are supplied to the transmitter MPU 44.

With the system of the present invention, the "puller" person is no longer needed, but the shooter still uses a voice command such as the accustomed word "pull" to trigger release of a target. The sound level of the voice command must be above a reference sensitivity level to generate the INITIATE signal. This is achieved by the amplifier and rectifier circuit 50 and the sensitivity circuit 53.

FIG. 4 illustrates the steps performed by the transmitter MPU 44 in processing the signals supplied thereto. As is well known in the art of microprocessors, a microprocessor program controls the operations of the microprocessor. The transmitter MPU 44 has 8K of erasable programmable read only memory (EPROM) which stores the program and various other data used by the program. FIG. 4 is a flow chart illustrating the steps performed by the microprocessor under control of the program driving it.

The transmitter MPU 44 is controlled by its program to generate a digital word comprising a series of nine bits which are eventually transmitted to the receiver unit 14. Table 3 below describes the purpose of each of the bits of the digital word. Inches regard, the term "target" may include any projectile, such as a baseball or tennis ball.

TABLE 3

| Bit | Function |
| --- | --- |
| B0 | Start bit. Always high to indicate start looking for bits to follow. |
| B1 | Target Select bit for a high house target |
| B2 | Target Select bit for a low house target |
| B3 | Target Select bit for doubles |
| B4 | Voice bit to indicate voice triggering |
| B5 | Manual trigger bit to indicate manual triggering |

TABLE 3-continued

| Bit | Function |
| --- | --- |
| B6 | |
| B7 | Field Code bits to identify that word is valid one generated by a valid transmitter. |
| B8 | |

The state of each of bits B1–B5 is dependent on the type of trigger used and the particular target to be thrown, if so designated by the target select switches 29.

The transmitter MPU 44 is normally in a wait state. It is waiting for an INITIATE signal. When an INITIATE signal is received as shown at step 120, the transmitter MPU 44 checks whether the trigger signal is manual or voice. This is necessary to compensate for the reaction time of the human (the "puller") who normally releases the targets. The manual SWITCH signal and the digital pulse train are shown as being received as input at steps 122 and 124, respectively.

If a valid INITIATE signal is received, then in step 126, a test is made to determine if the SWITCH signal is present. If the SWITCH signal is present, then in step 128, the voice bit in the digital word is set false.

If the SWITCH signal is not detected, indicating that manual triggering is false, the transmitter MPU 44 examines 24 pulses of the digital pulse train in step 130 and continuously determines if a valid INITIATE signal exists for each pulse (the level of the detected audio signal is greater than the sensitivity threshold).

Step 132 represents the test for whether all 24 pulses are within the parameters set by the program and if an INITIATE signal is detected for each pulse. If each pulse width falls within prescribed minimum and maximum levels and an INITIATE signal exists for each pulse, then in step 134 the voice bit in the digital word is set true and the program proceeds. Otherwiser this portion of the program terminates and returns to steps 120–124. The minimum and maximum pulse widths are determined on the basis of testing of various individuals and are set based on expected results from these tests indicative of a "pull" call. The software running on the transmitter MPU 44 sets these values.

Next, in step 136, the positions of the target select switches 29 are detected, and if a particular target is selected, the appropriate one of the bits B2-B4 are set high in the digital word accordingly. A high bit in any of the bits B2-B4 means that 20 the corresponding particular target(s) is to be launched not in the normal skeet sequence. The field code bits B6-B8 are also set to indicate that the digital word is one generated and transmitted by a valid transmitter unit. Finally, an RF sync signal is supplied to the RF transmitter section 54 to turn on the oscillator 56, allowing it time to stabilize before a digital word is modulated.

In step 138, the voice, field code and target selection bits are combined into a nine bit serial word (1024 baud). This nine bit digital word is supplied as serial digital data output to the RF transmitter section 54, three times in step 140. As will be described hereinafter, the receiver unit 14 looks at three consecutive digital words to see if two out of three are the same. This serves to avoid errors in received data.

FIG. 5 illustrates the steps in which the RF transmitter section 54 modulates the digital word for transmission to the receiver unit 14. The serial data is received in step 142 by the RF transmitter section. The digital data is used to frequency shift modulate the oscillator in step 144. The RF carrier signal is at 49,845 MHZ±5 KHZ modulation in step 146.

Figure 6:
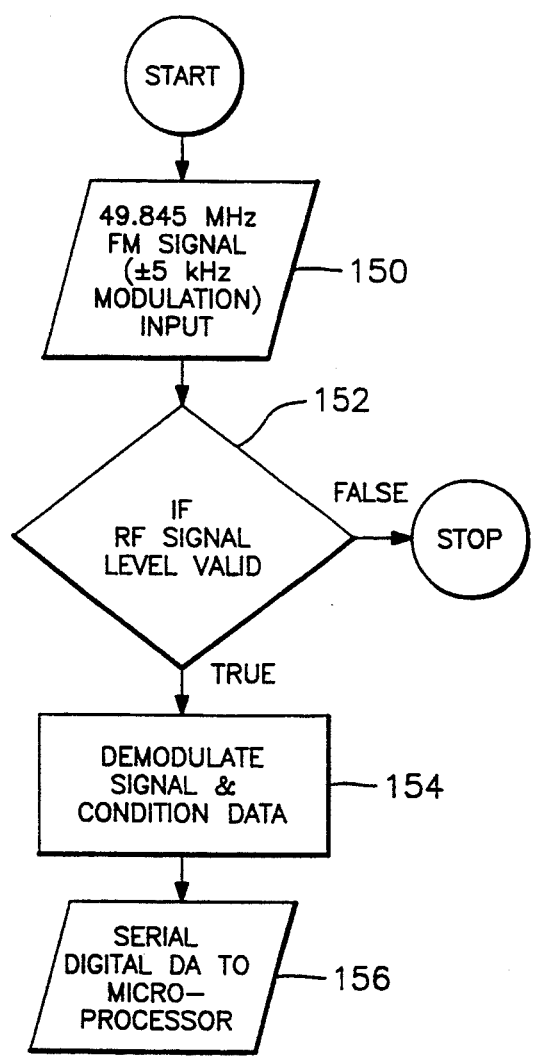
FIGS. 6-8 flow chart diagrams illustrating the operation of the receiver unit.
Figure 7:
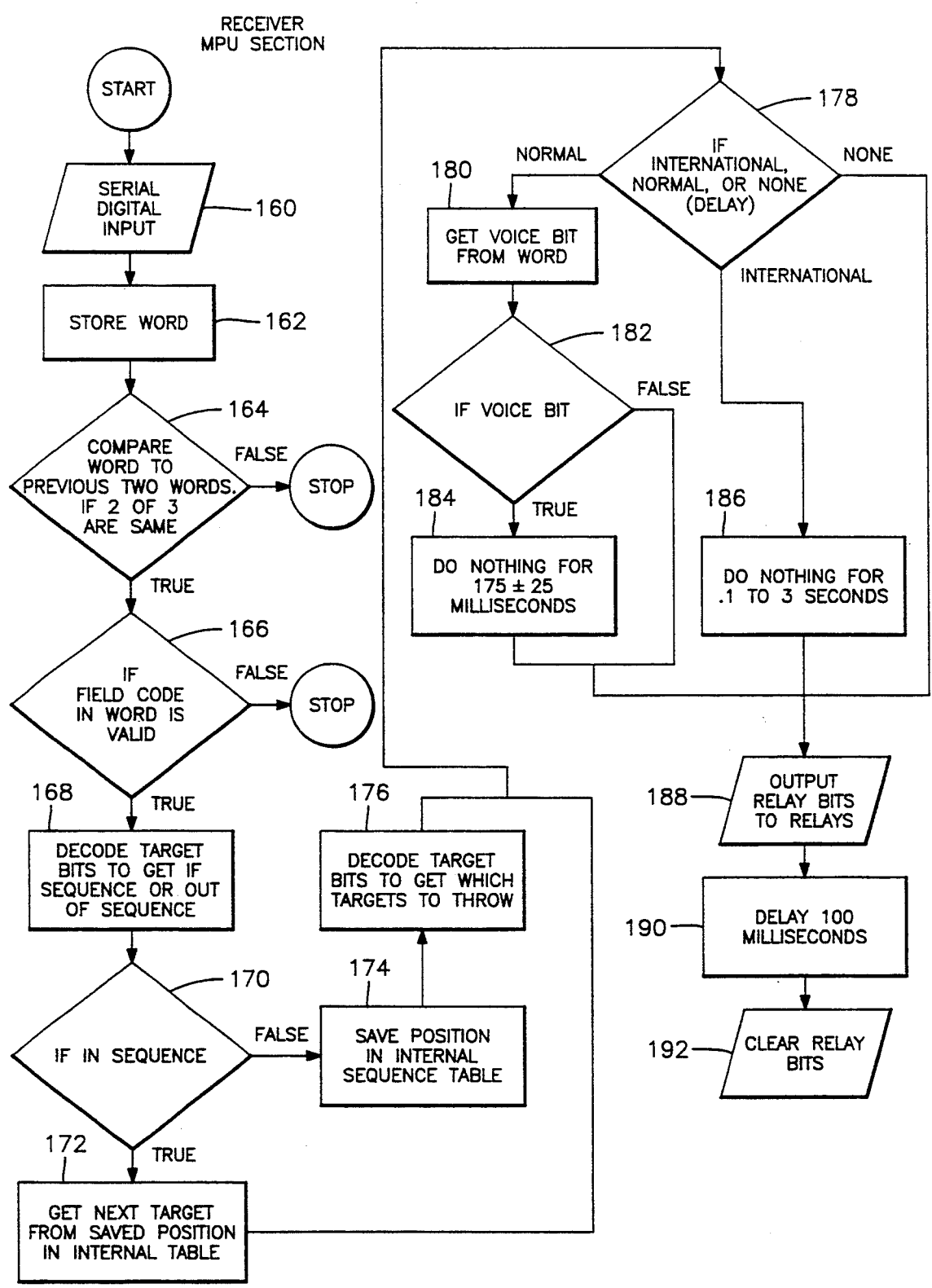
Figure 8:
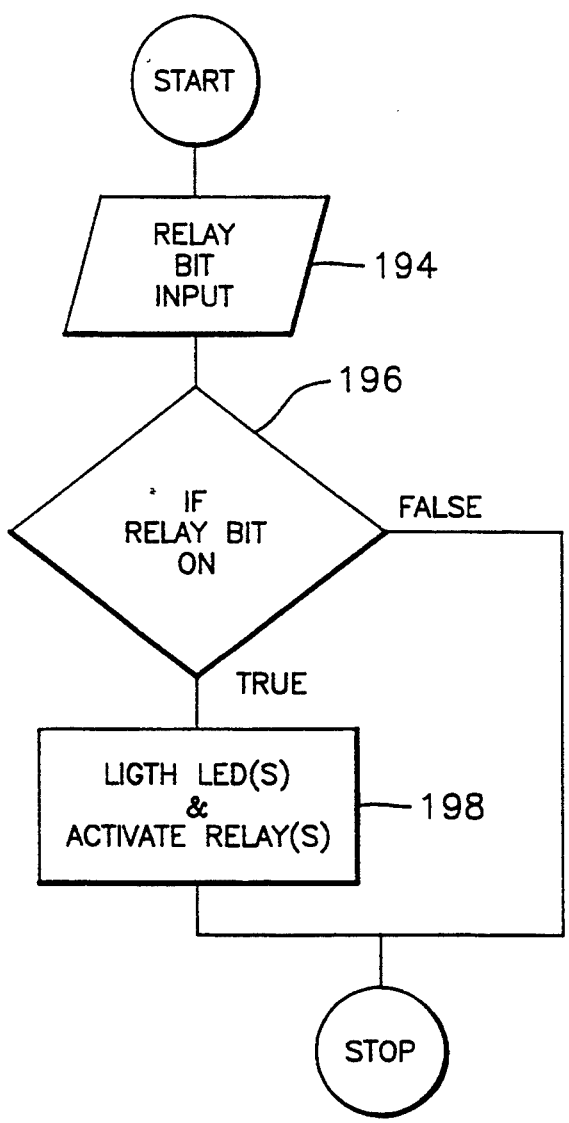
Figure 9:
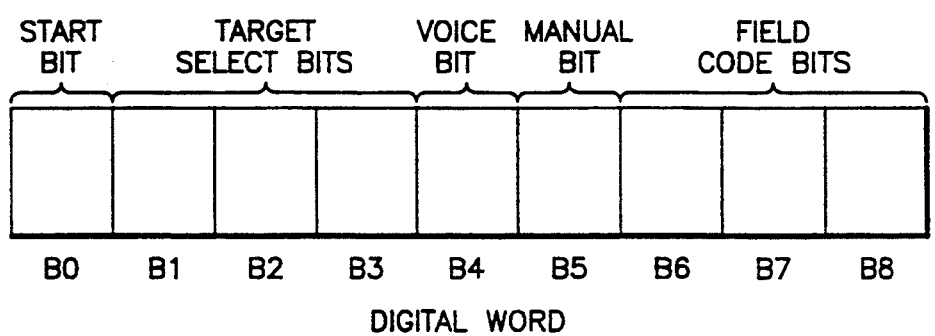
FIG. 9 is a diagram of the digital word transmitted according to the present invention.

With reference to FIGS. 6–8 in conjunction with FIG. 2B, the operation of the receiver unit 14 will now be described.

FIG. 6 illustrates the operation of the RF receiver section 62. In step 150, the 49,845 MHZ FM signal is received via the receiver antenna 40. Then, the level comparator 64 compares the level of the FM signal with a reference level to determine if it is a valid RF signal in step 152. If the level of the FM signal exceeds the reference level, then the FM signal is demodulated by the oscillator demodulator 66 and conditioned (amplified and squared off to form binary data) by the data conditioner 68 in step 154. Otherwise, the data conditioner 68 and receiver MPU 60 are maintained off until "good" data is received. The demodulated data are the bits of the digital word transmitted by the transmitter unit, which are supplied serially to the receiver MPU 60.

FIG. 7 illustrates the steps of execution performed by the receiver MPU 60 in processing received data. The receiver MPU 60 operates in a wait state until it receives data from the RF receiver section 62. Serial digital data is input in step 160 until the nine bits of a transmitted digital word are accumulated, which digital word is stored in a memory of the receiver MPU 60 in step 162.

Once a full nine bit digital word is received and stored, it is compared with the previous two received words in step 164. If two of the three words are not the same, then the receiver MPU 60 waits until it receives another word and repeats this process. If two of the three words are the same, the program checks the field code bits to see if the word is valid in step 166. If the field code is not valid, it returns to the wait state. Otherwise, if the field code of the word is valid, then the process proceeds to step 168 in which the target bits B2–B4 of the word are examined to determine if a particular target(s) not in the normal sequence, or the next target(s) in the sequence, are to be launched.

Normally, if at the preceding target release, an in-tact target is launched and the shooter hits the target or otherwise desires to proceed with the next target, then the shooter will not depress any of the target select switches H, L or D on his/her transmitter unit. Rather, the target select switch S will remain depressed. Therefore, the target bits B2–B4 in the transmitted word for the next target release will be low to indicate that the next target in the normal sequence is to be released. On the other hand, if the target launched at the preceding release was broken, or if the shooter otherwise desires to repeat an attempt at that target station, then the shooter will depress one of the target select switches H, L or D, setting one of the bits B2–B4 high to indicate that the particular target (or both targets in the case of doubles) is to be launched, rather than proceeding to the next target in the normal sequence.

In this regard, the receiver MPU has stored a target sequence table similar to Tables 1 and 2 above, for maintaining the normal sequence of target releases for American or International skeet. If the target bits B2–B4 are all low indicating that the target to be launched is the next one in the sequence, then the target sequence table is accessed to determine the next target to be launched. This is represented at steps 170 and 172.

Moreover, the system is capable of handling multiple shooters. To this end, for more than one shooter, the switch 38 is moved to the desired position. For each position of the switch 38, the receiver MPU 60 employs a unique target sequence table. For example, for 2 shooters, the target sequence table is similar to one of Tables 1 and 2, except that for each target station, the entries are duplicated. That is, at station 1, the target sequence is High, Low, Doubles (for shooter 1), then High, Low, Doubles (for shooter 2). Thus, for three shooters, the target sequence would be tripled at each station. The same applies for four and five shooters.

If a shooter decides to repeat an attempt at any station or to relaunch a target should a broken target be launched, then he/she merely depress the appropriate one of the target select buttons 29, and the receiver MPU 60 respond accordingly to launch that target while keeping track of the target sequence.

A shooter may also take advantage of the sequencing algorithm in skeet to repeat his/her first miss as an option shot to make the 25th target. Or, if no targets are missed in the round, the shooter repeats the last target in the sequence to make the 25th target.

Specifically, if one of the target bits B2–B4 are high, indicating that the word is for a selected target out of sequence, then the position of the next selection in the target sequence table is saved in step 174, and the target bits are further decoded in step 176 to determine which target to launch.

Next, in step 178, the position of the receiver delay switch 36 is checked to determine the delay for the release of the target. There are three paths for this decision. If no delay is selected, then there is no delay for launching the target even if the transmitted voice bit is true. In this case, the algorithm proceeds directly to step 188 to output the relay bits to the relays. If normal delay is selected, the voice bit is obtained from the received digital word in step 180 and examined in step 182. If the voice bit 182 is on (true), then the receiver MPU 60 generates a 175 (+/−25) msec delay in step 184 before proceeding to step 188. If International delay is selected, then a randomly generated and variable delay of 0.1 to 3.0 seconds is generated in step 186 before proceeding to step 188.

In step 188, the receiver MPU 60 generates relay bits on the basis of the decoded target bits for controlling the appropriate launching relay and supplies these bits to relays 72 and 74. There are two relay bits, one bit for the high house relay 72 and one bit for the low house relay 74. In step 190, a delay of 100 msec is provided to ensure that the solenoid in the skeet machine has time to fully energize, the relay bits are cleared in step 192 and the receiver MPU returns to the wait state.

FIG. 8 illustrates the steps for processing the relay bits generated by the receiver MPU 60. In actuality, two programs of this type are running, one for each of the relay circuits 72 and 74. Recalling from steps 188–192 of FIG. 7 that the relay bits are output and 100 milliseconds later they are cleared. This is to be sure that the transistor of the relay circuits are turned on only for short durations to release a target, and then turned off. Accordingly, in step 194, the relay bit is received. If it is high as determined in step 196, the transistor of the relay circuit is driven high to conduct thus closing the switch in its output circuit to energize the solenoid in step 198. In addition, the particular one or ones of the LED's 42 on the receiver unit is energized when the particular relay (high house or low house) has been activated. This provides the user with a visual indication that the system is operating properly. If on the other hand, the relay bit is low, then the transistor is not turned on and the solenoid in the target launcher is not energized.

The present invention may also be used to trigger target launching machines on fields used for clay target sports other than skeet, such as trap or sporting clays. A single machine might be assigned to either of the relay circuits and controlled by appropriate switch selection. The trap version of this invention employs only the high house relay circuit. A sporting clays application of the invention might involve assigning one target launching machine to each relay circuit thereby allowing the machines to be controlled by switch selection and released by voice command.

The trap version of the present invention will differ from the skeet version in that the transmitter unit will have only an on/off switch, a sensitivity control knob, and a manual release button. The receiver will have only an on/off switch and one LED, and only one relay circuit.

The present invention may be modified in certain ways without departing from the scope and spirit thereof. In particular, numerous methods are available to encode, transmit and decode digital data, which methods may be employed in the present invention to reduce errors in transmission and to operate analog circuitry well within their performance capabilities. One method which is useful is to further encode the nine bit digital word by using the code generated by the transmitter MPU 44 as an address in a look up table (stored in the MPU 44) to retrieve a digital word for transmission, which new digital word would preferably be easier to transmit by the RF transmitter section. In this case, the receiver MPU would have a similar look up table to decode the transmitted digital word.

The present invention also has utility in controlling other target launching machines, such as a baseball pitching machine or a tennis serving machine, where specified target sequences may or may not need to be maintained.

The above description is intended by way of example only and is not intended to limit the present invention in any way except as set forth in the following claims.

We claim:

1. A system for voice triggering a target launching machine comprising:
   transmitter means adapted to be attached to worn on the body of a user comprising:
   a microphone carried by a user for detecting a voice trigger command of the user and generally as output an electrical signal representative thereof;
   target select switches for designating a particular target to be launched;
   means for converting the output of said microphone to a digital pulse train;
   transmitter microprocessor means receiving as input the digital pulse train generated by said means for converting and the output of said target select switches for generating a digital word comprising a plurality of binary bits, said digital word indicating the target to be launched;
   modulating means for modulating said digital word onto a radio frequency carrier signal;
   radio frequency transmission means for transmitting said carrier signal through the air waves;
   receiver means adapted to be placed proximate the target launching machine and interfacing therewith, said receiver means comprising:
   an interface cable to connect said receiver means with said target launching in place of a cable supporting conventional mechanical pulling switches;
   radio frequency receiving means for receiving the carrier signal transmitted by said transmitter means;
   demodulation means for demodulating said carrier signal to obtain said digital word;
   relay means for generating relay control signals to control the target launching machine, said relay control signals being supplied to said target launching machines through said interface cable;
   receiver microprocessor means for examining said digital word and generating relay control signals to control said relay means, said receiver microprocessor means including storage means for storing a target sequence specifying a normal sequence of targets to be launched, said receiver microprocessor means decoding said digital word to determine which target is to be launched and whether the target designated in said digital word is in sequence, and generating said relay control signals to launch either a target in the target sequence or a target not in the target sequence on the basis of said digital word.

2. The system of claim 1, wherein said transmitter microprocessor means generates the digital word consisting of a voice bit indicating that voice triggering is used, target select bits indicating which target or targets are to be launched.

3. The system of claim 2, wherein said receiver microprocessor means examines the target select bits of the demodulated digital word to determine if a target to be launched is not in the normal sequence, and if any one of said target bits is high, said receiver microprocessor means saves the position in the normal sequence for the next target, and generates relay control signals for triggering release of the corresponding target, and if all of said target bits are low, said receiver microprocessor means accesses said stored target sequence to determine the next target in the normal sequence to be launched and generates relay control signals on the basis thereof.

4. The system of claim 3, wherein said transmitter microprocessor means generates said digital word to further comprise field code bits which indicate that said digital word is generated by a valid transmitter means, and said receiver microprocessor means examines said field code bits prior to further processing to determine that said digital word is valid.

5. The system of claim 1, wherein said transmitter means further comprises a manual push button trigger switch for triggering the release of a target manually.

6. The system of claim 2, wherein the means for converting of the transmitter means comprises:
   amplifying and rectifying circuit means for amplifying the output of said microphone and providing a DC level thereof, and for integrating the output of microphone and generating a series of spikes, the duration of which is proportional to the frequency of the output of said microphone.

7. The system of claim 6, wherein said transmitter means further comprises sensitivity circuit means for receiving the DC output of said amplifying and rectifying means, comparing the DC output with a reference level, and providing an output signal to said microprocessor when said DC level exceeds said reference level, said means for converting further comprising an analog-to-digital converting means for converting the spikes output by said amplifying and rectifying means to a digital pulse train supplied to said transmitter microprocessor means, the pulse widths of pulses of said digital pulse train being proportional to the frequency of the output of the microphone.

8. The system of claim 7, wherein said transmitter microprocessor means examines a predetermined number of consecutive pulses of the digital pulse train and the output of said sensitivity circuit means and sets said voice bit high when all of the predetermined number of pulses of said digital pulse train have pulse widths within predetermined maximum and minimum values and if an output signal is received from said sensitivity circuit for each of said predetermined number of consecutive pulses.

9. The system of claim 1, and further comprising a plurality of transmitter means, said receiver means being responsive to each of the plurality of transmitter means and comprising a participant switch for designating the number of shooters to participate, said receiver microprocessor means storing a target sequence unique to each position of the participant switch so that multiple users may communicate via associated transmitter means with said receiver means.

10. The system of claim 1, wherein the receiver means includes delay switch selection means for setting a delay of target release, the delay switch selection means having a position for no delay, American delay, and International delay.

11. The system of claim 7, wherein the transmitter means further comprises a sensitivity control knob for setting the reference level.

12. The system of claim 1, wherein the target launching machine comprises at least first and second clay target launchers, said first and second target launchers being responsive to said relay control signals.

13. A method for voice triggering a target launching machine comprising the steps of:
mounting a transmitter on the body of a user;
detecting a voice trigger command of the user;
generating an electrical signal representative of said voice trigger command;
converting the electrical signal into a digital pulse train;
generating a digital word comprising a plurality of binary bits, said digit word indicating the target to be launched;
modulating said digital word onto a radio frequency carrier signal;
transmitting said carrier signal through the air waves from said transmitter;
interfacing a receiver at said target launching machine to replace a conventional cord switch unit;
receiving the carrier signal at said receiver;
demodulating said carrier signal to obtain said digital word;
storing a target sequence specifying a normal sequence of targets to be launched at said receiver;
examining said digital word to determine which target is to be launched and whether the target represented by said digital word is in the normal sequence; and
generating said relay control signals on the basis of said digital word to control said target launching machine to launch either a target in the normal sequence or a target not in the normal sequence.

14. The method of claim 13, wherein said step of examining said digital word further comprises the step of maintaining a position in the normal target sequence upon receiving a digital word indicating a target not in the normal sequence is to be launched, and returning to the position upon receiving a digital word indicating a next target in the stored target sequence is to be launched.

15. The system of claim 1, wherein the receiver microprocessor means maintains a position in the stored target sequence upon receiving a digital word indicating a target not in the stored target sequence is to be launched, and returning to the position upon receiving a digital word indicating a next target in the stored target sequence is to be launched.

16. A system for voice triggering a target launching machine capable of launching targets at various trajectories, the system comprising:
transmitter means worn by a user including microphone means for detecting a voice trigger command of the user and generating an electrical output signal in response thereto, target designating means for designating a particular trajectory of a target to be launched and for designating the next trajectory of a target in a target trajectory sequence, generating means for generating a trigger signal in response to the electrical output signal and the trajectory designated by the target designating means, and sending means for transmitting the trigger signal; and
receiver means associated with the target launching machine, said receiver means including means for storing at least one target trajectory sequence and means for receiving the trigger signal transmitted by said transmitter means and for determining whether the trajectory of a target to be launched is to be based on the stored target sequence or on the trigger signal and for generating relay control signals accordingly; and
connecting means for connecting said receiver means with said target launching machine, wherein said target launching machine launches a target in response to receipt of said relay control signals.

17. The system of claim 16, wherein said transmitter means further comprises amplifying and rectifying circuit means for amplifying the electrical output signal of said microphone means and providing a DC level thereof, and for integrating the electrical output signal of the microphone means and generating a series of spikes, the duration of which is proportional to the frequency of the electrical output signal of said microphone means.

18. The system of claim 17, wherein said transmitter means further comprises sensitivity circuit means for receiving the DC output of said amplifying and rectifying means, comprising the DC output with a reference level, and providing an output signal to said generating means when said DC level exceeds said reference level, said generating means generating the trigger signal in response to the output signal of said sensitivity circuit means.

19. The system of claim 16, and further comprising a plurality of transmitter means, said receiver means being responsive to each of the plurality of transmitter means and comprising a participant switch for designating the number of shooters to participate.

20. The system of claim 16, wherein the target designating means comprises buttons which when depressed indicate a particular target trajectory not part of the target sequence.

21. The system of claim 20, wherein said receiver means comprises a receiver microprocessor means connected to the relay means and storing target sequence data representing said target sequence, the receiver microprocessor means comparing information in the received trigger signal with the target sequence data to trigger the relay means for launching either a target trajectory in the target sequence or a target trajectory not in the target sequence.

22. The system of claim 16, wherein the receiver means comprises means for maintaining a position in the stored target sequence upon receiving a trigger signal indicating a target trajectory not in the trajectory sequence is to be launched, and returning to the position upon receiving a trigger signal indicating a next target trajectory in the target trajectory sequence.

23. The system of claim 16, wherein said transmitter means further comprises a manual push button trigger switch for manually triggering the release of a target, the output of the manual push button trigger being connected to said generating means for permitting manual generation of the trigger signal.

24. A system for voice triggering a target launching machine capable of launching targets at various trajectories, the system comprising:
a plurality of transmitter means each to be worn by a user including microphone means for detecting a voice trigger command of the user and generating an electrical output signal in response thereto, target designating means for designating a particular trajectory of a target to be launched and for designating the next trajectory of a target in a target trajectory sequence, generating means for generating a trigger signal in response to the electrical output signal and the trajectory designated by the target designating means, and sending means for transmitting the trigger signal; and
receiver means associated with the target launching machine and responsive to each of the plurality of transmitter means, said receiver means including a participant switch for designating the number of shooters to participate and means for receiving the trigger signal transmitted by said transmitter means and for determining the trajectory of a target to be launched and for generating relay control signals accordingly; and
connecting means for connecting said receiver means with said target launching machine, wherein said target launching machine launches a target in response to receipt of said relay control signals.

* * * * *